United States Patent
Kim et al.

(10) Patent No.: US 10,793,657 B2
(45) Date of Patent: Oct. 6, 2020

(54) ANTIFOULING ACRYLIC RESIN FOR ADDITIVE

(71) Applicant: LG HAUSYS, LTD., Seoul (KR)

(72) Inventors: Yu-Jun Kim, Anyang-si (KR); Seong-Hoon Yue, Seongnam-si (KR); Hwan-Seok Park, Seoul (KR); Hea-Won Kwon, Seoul (KR); Yea-Ri Song, Seoul (KR); Da-Young Yu, Uiwang-si (KR); Hae-Rim Nam, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 17 days.

(21) Appl. No.: 15/753,944

(22) PCT Filed: Oct. 28, 2015

(86) PCT No.: PCT/KR2015/011461
§ 371 (c)(1),
(2) Date: Feb. 20, 2018

(87) PCT Pub. No.: WO2017/073807
PCT Pub. Date: May 4, 2017

(65) Prior Publication Data
US 2018/0244818 A1    Aug. 30, 2018

(51) Int. Cl.
| | | |
|---|---|---|
| *C08F 230/08* | (2006.01) |
| *C08F 220/18* | (2006.01) |
| *C08F 2/06* | (2006.01) |
| *C09D 5/00* | (2006.01) |
| *C08F 220/00* | (2006.01) |
| *C08F 290/06* | (2006.01) |
| *C09D 133/00* | (2006.01) |
| *C08F 8/14* | (2006.01) |
| *C08F 2/48* | (2006.01) |
| *C09D 4/00* | (2006.01) |

(52) U.S. Cl.
CPC .............. *C08F 230/08* (2013.01); *C08F 2/06* (2013.01); *C08F 2/48* (2013.01); *C08F 8/14* (2013.01); *C08F 220/00* (2013.01); *C08F 220/18* (2013.01); *C08F 290/068* (2013.01); *C09D 4/00* (2013.01); *C09D 5/00* (2013.01); *C09D 133/00* (2013.01)

(58) Field of Classification Search
CPC .... C08F 230/08; C08F 220/00; C08F 220/18; C08F 8/14; C08F 290/68
USPC ....................................................... 526/279
See application file for complete search history.

(56) References Cited

U.S. PATENT DOCUMENTS

| | | | |
|---|---|---|---|
| 8,703,875 B2 * | 4/2014 | Chang | C08F 8/00 525/326.5 |
| 2007/0212556 A1 | 9/2007 | Musa et al. | |
| 2008/0231798 A1 * | 9/2008 | Zhou | C08F 283/12 351/159.33 |
| 2015/0378282 A1 * | 12/2015 | Honya | G03G 15/162 524/430 |

FOREIGN PATENT DOCUMENTS

| | | |
|---|---|---|
| EP | 2848663 A1 | 3/2015 |
| JP | 2014091831 A | 5/2014 |
| JP | 5661844 B2 | 1/2015 |
| KR | 10-0325530 B1 | 4/2002 |
| KR | 10-2010-0094320 A | 8/2010 |
| KR | 10-2011-0043444 A | 4/2011 |
| KR | 10-2011-0135699 A | 12/2011 |
| KR | 10-2012-0055220 A | 5/2012 |
| KR | 10-1237584 B1 | 2/2013 |

OTHER PUBLICATIONS

Extended European Search Report dated Aug. 30, 2018, in connection with the European Patent Application No. 15907352.7 citing the above reference(s).
International Search Report for PCT/KR2015/011461 dated Aug. 5, 2016, citing the above references.

* cited by examiner

*Primary Examiner* — Margaret G Moore
(74) *Attorney, Agent, or Firm* — Hauptman Ham, LLP

(57) ABSTRACT

Provided is an antifouling acrylic resin that contains: a first structural unit derived from a first acrylic monomer; a second structural unit derived from a second acrylic monomer into which a polysiloxane side chain is introduced; and a third structural unit derived from a third acrylic monomer into which a photocurable functional group is introduced.

8 Claims, No Drawings

ANTIFOULING ACRYLIC RESIN FOR ADDITIVE

CROSS REFERENCE TO RELATED APPLICATION

This present application is a national stage filing under 35 U.S.C § 371 of PCT application number PCT/KR2015/011461 filed on Oct. 28, 2015. The disclosures of the above-listed applications are hereby incorporated by reference herein in their entirety.

TECHNICAL FIELD

The present invention relates to a pollution proof acrylic resin for additive.

BACKGROUND ART

When surfaces of substrates such as wood ash, papers, plastics, and the like are polluted by a permanent pen, and the like, it is difficult to remove or clean pollutants. Accordingly, a method of removing or cleaning various pollutants, or a method of forming a coating layer to improve antifouling performance such as prevention of pollutant attachment or removal of pollutants, has been reviewed in recent years.

Therefore, a demand for research into a coating composition for forming the coating layer to improve the removal of pollutants, or a pollution proof additive included in the coating composition, and the like, has been increased.

DISCLOSURE

Technical Problem

An aspect of the present invention is to provide to a pollution proof acrylic resin having secured pollution proof and abrasion resistance by including a first structural unit, a second structural unit, and a third structural unit.

Technical Solution

In accordance with one aspect of the present invention, a pollution proof acrylic resin includes: a first structural unit derived from a first acrylic monomer, a second structural unit derived from a second acrylic monomer into which a polysiloxane side chain is introduced, and a third structural unit derived from a third acrylic monomer into which a photo-curable functional group is introduced.

The first acrylic monomer, the second acrylic monomer, and the third monomer may be at least one selected from the group consisting of n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate, n-dodecyl methacrylate, n-butyl acrylate, butyl methacrylate, isobutyl acrylate, propyl acrylate, ethyl acrylate, methyl acrylate, 3-methylbutyl acrylate, n-hexyl methacrylate, n-octyl methacrylate, n-tetradecyl methacrylate, methyl methacrylate, glycidyl methacrylate, methyl glycidyl methacrylate, and cyclic epoxy methacrylate, and combinations thereof.

The pollution proof acrylic resin may be a resultant product obtained by forming an intermediate through solution-polymerization on the first acrylic monomer, the second acrylic monomer, the third acrylic monomer, silicon acrylate, and a polymerization initiator, and mixing the formed intermediate with (meth)acrylic acid and a catalyst to modify an epoxy group of the third structural unit with a photo-curable functional group.

In the solution-polymerization, the silicon acrylate may have a content of 1 to 20 parts by weight relative to 100 parts by weight of the first acrylic monomer, the second acrylic monomer, and the third acrylic monomer.

The intermediate may have a glass transition temperature of about 10° C. to about 105° C.

The solution-polymerization may be performed at a temperature of about 60° C. to about 120° C.

The photo-curable functional group may be formed by reacting the epoxy group with the (meth)acrylic acid, the (meth)acrylic acid having a content of 1 to 1.5 equivalent relative to 1 equivalent of the epoxy group.

The epoxy group and the (meth)acrylic acid may react at a temperature of about 80° C. to about 120° C.

At least one end of the polysiloxane side chain may include a (meth)acrylate group.

The polysiloxane side chain may be derived from one selected from the group consisting of poly(methyl-phenyl)siloxane, poly(dimethyl-diphenyl)siloxane, polydimethylsiloxane, and combinations thereof.

The polysiloxane side chain may have a weight average molecular weight of about 1,000 to about 20,000.

The photo-curable functional group may be at least one selected from the group consisting of an unsaturated double bond (C=C), an azide ($-N_3$) functional group, an epoxide functional group, a glycidyl functional group, and combinations thereof.

The pollution proof acrylic resin may include about 10 wt % to about 40 wt % of the first structural unit, about 10 wt % to about 40 wt % of the second structural unit, and about 30 wt % to about 70 wt % of the third structural unit.

Advantageous Effects

The pollution proof acrylic resin may have secured pollution proof and abrasion resistance, even in a small content.

Further, the pollution proof acrylic resin is usable as an additive to be utilized for a pollution proof coating liquid composition having excellent abrasion resistance, pollution proof, and durability.

BEST MODE

Hereinafter, exemplary embodiments of the present invention will be described in detail. However, these exemplary embodiments are only provided by way of example, and the present invention is not limited to these exemplary embodiments. Therefore, the present invention will be defined only by the scope of the appended claims.

In an exemplary embodiment of the present invention, the present invention provides a pollution proof acrylic resin including a first structural unit derived from a first acrylic monomer, a second structural unit derived from a second acrylic monomer into which a polysiloxane side chain is introduced, and a third structural unit derived from a third acrylic monomer into which a photo-curable functional group is introduced.

In order to provide pollution proof to a coating liquid composition, a method of securing pollution proof was generally used by introducing a hydrophobic fluorine-based compound, or a silicon-based surfactant to the coating liquid composition, and coating and curing the coating liquid composition so that the compound or the surfactant is positioned on a surface of the coating layer.

However, in this case, since there was no chemical bond between the compound or the surfactant with a binder of the coating layer, if external stress was applied to the surface of the coating layer, the compound or the surfactant was separated from the surface of the coating layer, such that an effect of pollution proof was rapidly reduced, and the effect of pollution proof was not exhibited at all depending on the coating liquid composition.

Meanwhile, the pollution proof acrylic resin according to the present invention has excellent abrasion resistance and pollution proof itself, and when the pollution proof acrylic resin of the present invention is included in the coating liquid composition as an additive, the resin is capable of being bound with a binder of the composition, thereby continuously exhibiting pollution proof and abrasion resistance without separation due to external stress.

In addition, the pollution proof acrylic resin may include: the first structural unit derived from the first acrylic monomer, the second structural unit derived from the second acrylic monomer into which a polysiloxane side chain is introduced, and the third structural unit derived from the third acrylic monomer into which a photo-curable functional group is introduced.

Specifically, the pollution proof acrylic resin may be a polymeric resin based on an acrylic resin, including an acrylic main chain and a polysiloxane side chain, wherein a photo-curable functional group-containing side chain is introduced into the main chain.

The pollution proof acrylic resin includes the second structural unit derived from the second acrylic monomer into which the polysiloxane side chain is introduced, thereby exhibiting maximized pollution proof, and when the resin is used at the same content as a generally used additive, for example, a silicon-based surfactant, more excellent pollution proof of the resin may be exhibited.

Further, since the photo-curable functional group is bound to the binder included in the coating liquid composition in the third structural unit derived from the third acrylic monomer into which the photo-curable functional group is introduced, when the pollution proof acrylic resin is used as an additive of the coating liquid composition, migration phenomenon may be minimized to exhibit excellent pollution proof and durability. In addition, abrasion resistance of the pollution proof acrylic resin may be improved due to own properties of the first structural unit.

The first acrylic monomer, the second acrylic monomer, and the third monomer may be at least one selected from the group consisting of n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate, n-dodecyl methacrylate, n-butyl acrylate, butyl methacrylate, isobutyl acrylate, propyl acrylate, ethyl acrylate, methyl acrylate, 3-methylbutyl acrylate, n-hexyl methacrylate, n-octyl methacrylate, n-tetradecyl methacrylate, methyl methacrylate, glycidyl methacrylate, methyl glycidyl methacrylate, and cyclic epoxy methacrylate, and combinations thereof.

For example, among the first acrylic monomer, the second acrylic monomer, and the third acrylic monomer, butyl methacrylate, methyl methacrylate, and glycidyl methacrylate may be used to control a glass transition temperature of an intermediate to be described below.

Specifically, about 10 wt % to about 40 wt % of butyl methacrylate, about 10 wt % to about 40 wt % of methyl methacrylate, and about 30 wt % to about 70 wt % of glycidyl methacrylate may be used, which is advantageous in that the monomer having the above-described content is capable of controlling the glass transition temperature and curing degree, thereby easily obtaining target hardness, elongation rate, and adhesion property.

The pollution proof acrylic resin may be a resultant product obtained by forming an intermediate through solution-polymerization on the first acrylic monomer, the second acrylic monomer, the third acrylic monomer, silicon acrylate, and a polymerization initiator, and mixing the formed intermediate with (meth)acrylic acid and a catalyst to modify an epoxy group of the third structural unit with a photo-curable functional group.

The intermediate may be formed by performing solution-polymerization on the first acrylic monomer, the second acrylic monomer, the third acrylic monomer, silicon acrylate, and a polymerization initiator. Due to the intermediate, the pollution proof acrylic resin may include the first structural unit and the second structural unit.

In the solution-polymerization, the silicon acrylate may have a content of about 1 to about 20 parts by weight relative to 100 parts by weight of the first acrylic monomer, the second acrylic monomer, and the third acrylic monomer.

When the content of the silicon acrylate is more than about 20 parts by weight, silicon acrylate that did not participate in the reaction may remain in an unreacted state, which deteriorates performance When the content of the silicon acrylate is less than about 1 part by weight, the content thereof is small, such that pollution proof performance may not be appropriately implemented.

Accordingly, when the silicon acrylate having the above-described content is used for solution-polymerization, it is advantageous in view of yield and implementation of pollution proof, and an effect of improving pollution proof may be easily implemented.

The polymerization initiator may include a thermal initiator or a photo-initiator, such that in the solution-polymerization, the polymerization initiator may have a content of about 0.1 part by weight to about 10 parts by weight relative to 100 parts by weight of the first acrylic monomer, the second acrylic monomer, and the third acrylic monomer. The polymerization initiator has the above-described content, thereby minimizing occurrence of gelation of the intermediate at the time of polymerization.

For example, the photoinitiator may include at least one selected from the group consisting of benzoin methyl ether, 2,4,6-trimethylbenzoyl diphenylphosphine oxide, bis(2,4,6-trimethylbenzoyl) phenylphosphine oxide, $\alpha,\alpha$-methoxy-$\alpha$-hydroxy acetophenone, 2-benzoyl-2-(dimethylamino)-1-[4-(4-morphonyl)phenyl]-1-butanone, and 2,2-dimethoxy-2-phenyl acetophenone.

In addition, the thermal initiator may be at least one selected from the group consisting of an azo-based compound, a peroxide-based compound, tert-butyl peracetate, peracetic acid, and potassium persulfate.

In addition to the silicon acrylate and the polymerization initiator, an antioxidant, a filler, a plasticizer, and the like, required for solution-polymerization may be further included.

The intermediate may have a glass transition temperature of about 10° C. to about 105° C. The glass transition temperature of the intermediate is preferably controlled within the above-described range in order to secure physical properties of a coating film to be formed by the resin. Specifically, when high elasticity (rubbery property) is required, the content of the monomer may be controlled so that the glass transition temperature is lower than room temperature, and when hard (glassy) property is required, the content of the monomer may be controlled so that the glass transition temperature is higher than room temperature.

The solution-polymerization may be performed at a temperature of about 60° C. to about 120° C. The solution-polymerization refers to a method of performing polymerization in a solution state by dissolving monomers in appropriate solvents. In the present invention, polymerization may be performed in a solution state by dissolving the first acrylic monomer, the second acrylic monomer, the third acrylic monomer, silicon acrylate, and the polymerization initiator in a solvent, at a temperature having the above-described range.

Examples of the solvent may include propylene glycol monomethyl ester acetate (PGMEA), methyl isobutyl ketone (MIBK), monomethyl ether acetic acid (EGMEA), butyl acetate (BAC), and the like. It is preferred that the solution-polymerization is performed at the temperature having the above-described range since a reaction rate is capable of being controlled through thermal initiation and temperature control while simultaneously not exceeding a boiling point.

The pollution proof acrylic resin may be a resultant product obtained by mixing the formed intermediate with (meth)acrylic acid and a catalyst to modify an epoxy group of the third structural unit with a photo-curable functional group. Specifically, the catalyst may be zinc (Zn), platinum (Pt), tin (Sn), and the like, and may modify the epoxy group of the third structural unit with the photo-curable functional group.

By modifying the epoxy group of the third structural unit with the photo-curable functional group, the third structural unit of the pollution proof acrylic resin may include the photo-curable functional group.

The photo-curable functional group may be at least one selected from the group consisting of an unsaturated double bond (C=C), an azide (—N$_3$) functional group, an epoxide functional group, a glycidyl functional group, and combinations thereof.

For example, when the pollution proof acrylic resin is included in the pollution proof coating liquid composition as an additive, the photo-curable functional group included in the pollution proof acrylic resin is bound to the binder of the pollution proof coating liquid composition, thereby minimizing the migration phenomenon and improving pollution proof and durability.

In addition, the first structural unit is also included in the pollution proof coating liquid composition, such that abrasion resistance of the pollution proof coating liquid composition may also be improved.

Specifically, the photo-curable functional group may be formed by reacting the epoxy group with the (meth)acrylic acid, wherein the meth(acrylic acid) has a content of about 1 to about 1.5 equivalent relative to 1 equivalent of the epoxy group.

In modifying the epoxy resin with the photo-curable functional group, the epoxy resin is capable of reacting with the (meth)acrylic acid, and the photo-curable functional group having the above-described range of molar content is advantageous in that unreacted materials may be minimized.

When the (meth)acrylic acid has a content of less than about 1 equivalent relative to 1 equivalent of the epoxy group in the reaction, the epoxy group does not react, but may remain, and when the (meth)acrylic acid has a content of more than about 1.5 equivalent, compatibility of the resin may be deteriorated since unreacted acrylic acid may remain.

The epoxy group and the (meth)acrylic acid may react at a temperature of about 80° C. to about 120° C. The epoxy group and the (meth)acrylic acid may react to modify the epoxy group with the photo-curable functional group, and the reaction is performed at the above-described range of temperature, thereby stably introducing the photo-curable functional group due to an n appropriate reaction rate.

At least one end of the polysiloxane side chain may include a (meth)acrylate group. The second structural unit is derived from the second acrylic monomer into which the polysiloxane side chain is introduced, and at least one end of the polysiloxane side chain may include a (meth)acrylate group.

In addition, the polysiloxane side chain may be at least one selected from the group consisting of poly(methyl-phenyl)siloxane, poly(dimethyl-diphenyl)siloxane, poly-dimethylsiloxane, and combinations thereof. For example, when the polysiloxane side chain includes polydimethylsiloxane, pollution proof may be maximized.

The polysiloxane side chain may have a molecular weight of about 1,000 to about 20,000. The molecular weight thereof may be a weight average molecular weight. When the molecular weight is less than about 1,000, the effect of pollution proof may be reduced, and when the molecular weight is more than about 20,000, the polysiloxane side chain does not react in a main chain due to lack of reactivity, but may remain in an unreacted state, such that the polysiloxane side chain having the above-described range of molecular weight is advantageous in that pollution proof may be exhibited and stable reaction with the main chain may be promoted.

The pollution proof acrylic resin may include about 10 wt % to about 40 wt % of the first structural unit, about 10 wt % to about 40 wt % of the second structural unit, and about 30 wt % to about 70 wt % of the third structural unit.

The pollution proof acrylic resin may include the second structural unit and the third structural unit each having the above described content, thereby exhibiting pollution proof and durability, and may include the first structural unit and the second structural unit each having the above described content, thereby securing excellent abrasion resistance.

The pollution proof acrylic resin may exhibit pollution proof and abrasion resistance even in a small content. Accordingly, the pollution proof acrylic resin may be utilized for a pollution proof coating liquid composition having excellent abrasion resistance, pollution proof, and durability, by using the pollution proof acrylic resin as an additive.

Hereinafter, specific examples of the present invention will be provided. Meanwhile, Examples to be described below are just provided for specifically exemplifying or explaining the present invention, and accordingly, the present invention is not limited to the following Examples.

EXAMPLE AND COMPARATIVE EXAMPLE

Example 1

A pollution proof acrylic resin was manufactyred by forming an intermediate through solution-polymerization on butyl methacrylate (BMA), methyl methacrylate (MMA), glycidyl methacrylate (GMA), silicon acrylate, and an azo-based thermal initiator at a temperature of 60° C. to 120° C., and mixing the formed intermediate with an acrylic acid and a zinc-based catalyst to modify an epoxy group of the intermediate with a photo-curable functional group.

Here, the acrylic acid had a content of 1 to 1.5 equivalent relative to 1 equivalent of the epoxy group. The acrylic acid and the epoxy group reacted at a temperature of 80° C. to 120° C. to modify the epoxy group with the photo-curable functional group.

The pollution proof acrylic resin was a polymeric resin including an acrylic main chain and a polydimethylsiloxane side chain having an acrylate group at an end, wherein an unsaturated double bond (C=C) is introduced into the acrylic main chain.

Comparative Examples 1 to 5

A polymeric resin including the photo-curable functional group but not including the polydimethylsiloxane side chain, was used as a Comparative Example 1.

In addition, FM0721 (JNC AMERICA, Inc.) including a polysiloxane side chain and a photo-curable functional group was used as an additive of Comparative Example 2, TEGO RAD2500 (Evonik Corporation) including a polysiloxane side chain and a photo-curable functional group was used as an additive of Comparative Example 3, BYK-3570 (BYK Corporation) including a polysiloxane side chain and a photo-curable functional group was used as an additive of Comparative Example 4, and 2-9147LF (Dow Corning Corporation) including a polysiloxane side chain having a larger molecular weight than that of Comparative Examples 2 to 4, but not including the photo-curable functional group, was used as an additive of Comparative Example 5.

TABLE 1

|  | Whether polysiloxane side chain is included | Whether photo-curable functional group is included | Note |
| --- | --- | --- | --- |
| Example 1 | Included | Included | Polymeric |
| Comparative Example 1 | Not Included | Included | Polymeric |
| Comparative Example 2 | Included | Included | Silicon-based Additive |
| Comparative Example 3 | Included | Included | Silicon-based Additive |
| Comparative Example 4 | Included | Included | Silicon-based Additive |
| Comparative Example 5 | Included | Not Included | Silicon-based Additive |

<Experimental Example> Properties of Pollution Proof Acrylic Resin

Each pollution proof acrylic coating liquid composition was formed by including each resin of Example and Comparative Examples as an additive, and mixing with a monomer including a double bond and an oligomer dilution solvent, followed by stirring. Then, slip property, pollution proof, and abrasion resistance were measured by using each composition.

1) Slip property: Slip property was measured by applying and drying each pollution proof acrylic coating liquid composition on a flooring material to form a coating layer, and observing an extent to which the coating layer was stained by a name pen. Depending on the extent of slip property, "◯" means excellent slip property, Δ means normal slip property, and X means poor slip property.

2) Pollution proof: Pollution proof was determined by applying and drying each pollution proof acrylic coating liquid composition on a flooring material to form a coating layer, and observing an extent to which a namepen was erased after the coating layer was stained by the name pen to the naked eye. After observation, depending on the extent of pollution, "◯" means no pollution, "Δ" means average pollution, and "X" means that there is pollution.

3) Abrasion resistance: Abrasion resistance was measured by applying and drying each pollution proof acrylic coating liquid composition on a flooring material to form a coating layer, and then placing a abrasion resistance tester on the flooring material on which the coating layer was formed, putting WYPALL cloth over the end of the tester and 500 g of a weight on the cloth, followed by reciprocation 100 times, and then confirming change in slip property. Depending on the extent of abrasion resistance, "◯" means no abrasion resistance, "Δ" means average abrasion resistance, and "X" means that there is abrasion resistance.

TABLE 2

|  |  |  | Abrasion Resistance | |
| --- | --- | --- | --- | --- |
|  | Slip Property | Pollution Proof | Before Abrasion | After Abrasion |
| Example 1 | ◯ | ◯ | ◯ | ◯ |
| Comparative Example 1 | X | X | X | X |
| Comparative Example 2 | Δ | Δ | X | X |
| Comparative Example 3 | Δ | Δ | X | X |
| Comparative Example 4 | Δ | Δ | Δ | Δ |
| Comparative Example 5 | X | X | X | X |

Referring to Table 2 above, the pollution proof acrylic coating liquid composition including the pollution proof acrylic resin of Example 1 had excellent slip property and pollution proof as compared to Comparative Examples 1 to 5, and had excellent abrasion resistance as compared to Comparative Examples 1 to 5, and further, had excellent abrasion resistance maintained after abrasion, as compared to other additives.

Meanwhile, Comparative Example 1 did not include a polysiloxane side chain, such that slip property and pollution proof were not secured. Comparative Examples 2 to 4 which are the silicon-based additive, exhibited insufficient slip property, pollution proof, and abrasion resistance, as compared to Example 1 including the polymeric additive. In addition, Comparative Example 5 did not include the photo-curable functional group, such that any one of the slip property, pollution proof, and abrasion resistance could not be secured.

The invention claimed is:

1. A pollution proof acrylic resin comprising:
  a first structural unit derived from a first acrylic monomer, wherein the first acrylic monomer is at least one selected from the group consisting of n-octyl acrylate, 2-ethylhexyl acrylate, 2-ethylbutyl acrylate, hexyl acrylate, heptyl acrylate, nonyl acrylate, pentyl acrylate, isooctyl acrylate, n-decyl methacrylate, n-dodecyl methacrylate, n-butyl acrylate, butyl methacrylate, isobutyl acrylate, propyl acrylate, ethyl acrylate, methyl acrylate, 3-methylbutyl acrylate, n-hexyl methacrylate, n-octyl methacrylate, n-tetradecyl methacrylate, and methyl methacrylate;
  a second structural unit derived from a second acrylic monomer, wherein a polysiloxane side chain is introduced into the second structural unit, and wherein the second acrylic monomer is a silicon acrylate; and a third structural unit derived from a third acrylic monomer into which a photo-curable functional group is introduced, wherein a photo-curable functional group is introduced into the third structural unit, and wherein the third acrylic monomer comprises an epoxy group, and wherein the third monomer is at least one selected from the group consisting of glycidyl methacrylate, methyl glycidyl methacrylate, and cyclic epoxy methacrylate, wherein the pollution proof acrylic resin is a resultant product obtained by forming an intermediate through a solution-polymerization of the first acrylic monomer, the third acrylic monomer, the silicon acrylate, and a polymerization initiator, and mixing the formed intermediate with (meth)acrylic acid and a catalyst to modify the epoxy group with a photo-curable functional group, wherein the photo-curable functional group is formed by reacting the epoxy group with the (meth)acrylic acid, wherein the pollution proof acrylic resin includes 10 wt % to 40 wt % of the first structural unit, 10 wt % to 40 wt % of the second structural unit, and 30 wt % to 70 wt % of the third structural unit.

2. The pollution proof acrylic resin of claim 1, wherein the intermediate has a glass transition temperature of 10° C. to 105° C.

3. The pollution proof acrylic resin of claim 1, wherein the solution-polymerization is performed at a temperature of 60° C. to 120° C.

4. The pollution proof acrylic resin of claim 1, wherein the (meth)acrylic acid has a content of 1 to 1.5 equivalent relative to 1 equivalent of the epoxy group.

5. The pollution proof acrylic resin of claim 4, wherein the epoxy group and the (meth)acrylic acid react at a temperature of 80° C. to 120° C.

6. The pollution proof acrylic resin of claim 1, wherein the polysiloxane side chain is derived from one selected from the group consisting of poly(methyl-phenyl)siloxane, poly(dimethyl-diphenyl)siloxane, polydimethylsiloxane, and combinations thereof.

7. The pollution proof acrylic resin of claim 1, wherein the polysiloxane side chain has a weight average molecular weight of 1,000 to 20,000.

8. The pollution proof acrylic resin of claim 1, wherein the photo-curable functional group is an unsaturated double bond (C=C).

* * * * *